US006771865B2

(12) United States Patent
Blaszyk et al.

(10) Patent No.: US 6,771,865 B2
(45) Date of Patent: Aug. 3, 2004

(54) LOW BEND LOSS OPTICAL FIBER AND COMPONENTS MADE THEREFROM

(75) Inventors: Paul E. Blaszyk, Horseheads, NY (US); Lisa L. Hepburn, Corning, NY (US); Gang Qi, Corning, NY (US); Steven H. Tarcza, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/315,287

(22) Filed: Dec. 9, 2002

(65) Prior Publication Data

US 2003/0223717 A1 Dec. 4, 2003

Related U.S. Application Data

(63) Continuation-in-part of application No. 10/103,512, filed on Mar. 20, 2002, now abandoned.

(51) Int. Cl.[7] .............................. G02B 6/02; G02B 6/00
(52) U.S. Cl. ......................... 385/127; 65/385; 385/141
(58) Field of Search .................... 65/385; 385/126–130, 385/141, 147

(56) References Cited

U.S. PATENT DOCUMENTS

| | | | |
|---|---|---|---|
| 3,981,707 | A | 9/1976 | Araujo et al. |
| 4,691,990 | A | 9/1987 | Cohen et al. |
| 4,691,991 | A | 9/1987 | Unger |
| 4,715,679 | A | 12/1987 | Bhagavatula |
| 4,734,117 | A | 3/1988 | Pilon et al. |
| 4,802,733 | A | 2/1989 | Bachmann et al. |
| 4,852,968 | A | 8/1989 | Reed |
| 4,877,304 | A | 10/1989 | Bhagavatula ............ 350/96.29 |
| 5,032,001 | A | 7/1991 | Shang |
| 5,035,477 | A | 7/1991 | Schlump |
| 5,115,260 | A | * 5/1992 | Hayward et al. ............ 385/100 |
| 5,130,535 | A | * 7/1992 | Kummer et al. ........ 250/227.16 |
| 5,138,676 | A | * 8/1992 | Stowe et al. .................. 385/32 |
| 5,142,603 | A | 8/1992 | Forrester |
| 5,203,898 | A | 4/1993 | Carpenter et al. |
| 5,361,319 | A | 11/1994 | Antos et al. ................ 385/123 |
| 5,381,503 | A | 1/1995 | Kanamori et al. |
| 5,412,745 | A | 5/1995 | Weidman et al. |
| 5,553,185 | A | 9/1996 | Antos et al. |

(List continued on next page.)

FOREIGN PATENT DOCUMENTS

| | | |
|---|---|---|
| JP | 04107510 | 4/1992 |
| WO | WO 99/04298 | 1/1999 |
| WO | WO 99/50696 | 10/1999 |
| WO | WO 00/04410 | 1/2000 |
| WO | WO 00/65390 | 11/2000 |
| WO | WO 01/18566 | 3/2001 |
| WO | WO 01/22136 | 3/2001 |
| WO | WO 01/38911 | 5/2001 |

OTHER PUBLICATIONS

Botham, "Theory of Tapering Single–Mode Optical Fibres by Controlled Core Diffusion", Electronics Letters, 18th Feb. 1998, vol. 24, No. 4, pp. 243–244.

Harper et al., "Tapers in Single–Mode Optical Fibre by Controlled Core Diffusion", Electronics Letters, 18th Feb. 1998, vol. 24, No. 4, pp. 245–246.

Primary Examiner—Akm Enayet Ullah
(74) Attorney, Agent, or Firm—Svetlana Z. Short

(57) ABSTRACT

The present invention provides an optical fiber suitable for the manufacture of optical fiber couplers and having low bend loss, low splice loss, and low attenuation. The optical fibers according to one aspect of the invention have bending loss of less than 0.5 dB at 1560 nm when wrapped 5 turns around a 20 mm mandrel; and an average fiber pull test loss of less than 0.1 dB in the wavelength range of 1530 nm to 1550 nm. The present invention also includes optical fiber components made from these optical fibers.

32 Claims, 8 Drawing Sheets

U.S. PATENT DOCUMENTS

| | | | |
|---|---|---|---|
| 5,748,824 A | 5/1998 | Smith | |
| 5,809,189 A | 9/1998 | Murphy et al. | |
| 6,078,716 A | 6/2000 | Huang et al. | |
| 6,084,233 A * | 7/2000 | Hodgson et al. | 250/227.14 |
| 6,125,225 A | 9/2000 | Dianov et al. | |
| 6,212,322 B1 | 4/2001 | Ma et al. | |
| 6,272,268 B1 | 8/2001 | Miller et al. | |
| 6,317,551 B1 | 11/2001 | Mitchell et al. | |
| 6,321,006 B2 | 11/2001 | Wu | |
| 6,335,995 B1 | 1/2002 | Kato et al. | 385/123 |
| 6,365,891 B1 * | 4/2002 | Hodgson et al. | 250/227.14 |
| 6,496,301 B1 * | 12/2002 | Koplow et al. | 359/337 |
| RE38,086 E | 4/2003 | Onishi et al. | 385/123 |
| 6,671,445 B2 * | 12/2003 | Bickham et al. | 385/127 |
| 2003/0103749 A1 * | 6/2003 | Kumar et al. | 385/127 |
| 2003/0218154 A1 * | 11/2003 | Sasaki | 252/582 |
| 2003/0223716 A1 * | 12/2003 | Christoff et al. | 385/124 |
| 2003/0223717 A1 * | 12/2003 | Blaszyk et al. | 385/127 |
| 2003/0231847 A1 * | 12/2003 | Varner et al. | 385/127 |

\* cited by examiner

LOW BEND LOSS OPTICAL FIBER AND COMPONENTS MADE THEREFROM

CROSS-REFERENCE TO RELATED APPLICATIONS

This application is a continuation-in-part of U.S. patent application Ser. No. 10/103,512, filed Mar. 20, 2002 Now abandoned, which is hereby incorporated herein by reference in its entirety. The benefit of priority under 35 U.S.C. §120 to the aforementioned application is hereby claimed.

BACKGROUND OF THE INVENTION

1. Field of the Invention

The present invention relates generally to optical communications, and more specifically to optical fibers having low bending loss suitable for splicing and for the fabrication of optical fiber components.

2. Technical Background

A high performance optical telecommunication system carries high data rates over long distances with no electronic regeneration. For example, rates of 10 Gb/s or more over unregenerated distances of three to five hundred kilometers have been achieved. A high performance system may employ high power signal lasers, optical amplifiers, dispersion compensation devices, optical switching devices, and may use wavelength division multiplexing. Optical telecommunications systems are progressing toward higher speeds and longer span lengths, making the requirements for system components more and more arduous.

One such system component is an optical fiber coupler. Optical fiber couplers provide for coupling of optical signals between optical fibers, and are ubiquitous in the devices used in optical telecommunications systems. Optical fiber couplers may be made, for example, by heating and stretching a pair of coextending optical fibers to fuse and taper them. An optical signal traveling in one of the optical fibers is evanescently coupled into the other optical fiber in the fused region. Optical fiber couplers are used in a variety of devices to split and combine optical signals. For example, optical coupler may be used to divide optical power between two paths with a desired ratio (e.g. 1:1, 9:1). An optical fiber coupler may also be used as a WDM to combine pump radiation with an optical signal in an erbium-doped fiber amplifier.

As the requirements for the optical performance of optical fiber couplers become ever more stringent, the need to eliminate sources of loss becomes critical. One such loss source is bending loss in the unfused regions of the optical fibers. Optical fiber couplers are generally made to have relatively long (e.g. 2–5 m) lengths of optical fiber leading from the coupling region. When an optical fiber coupler is assembled in a device, these optical fiber leads are often bent with a small radius or coiled around a spool. Conventional fibers used in the manufacture of optical fiber couplers tend to have relatively high bend losses, giving the assembled device an unacceptably high loss. While the use of conventional low-bend loss optical fibers will reduce bending losses, couplers fabricated from such fibers tend to exhibit high coupling losses. Further, splices between the low bend-loss optical fiber leads and other device components, such as erbium-doped optical fiber, tend to have relatively high losses.

Conventional optical fibers do not provide for the manufacture of optical fiber couplers with the desired performance. There remains a need for an optical fiber that exhibits low bending loss while also having low splice loss, low attenuation, and the ability to be fabricated into a low-loss optical fiber coupler. From the cost and process point of view, ease of manufacture and insensitivity of optical fiber properties to process variations are also highly desirable properties.

DEFINITIONS

The following definitions are in accord with common usage in the art.

The refractive index profile is the relationship between refractive index and optical fiber radius.

Delta, $\Delta$, is the relative refractive index percent, $\Delta=(n_1^2-n_c^2)/2n_c^2$, where $n_1$ is the specified refractive index in region i, and $n_c$ is the average refractive index of the cladding region.

The term $\alpha$-profile refers to a refractive index profile, expressed in terms of $\Delta(b)$, where b is radius, which follows the equation $$\Delta(b)=\Delta(b_0)(1-[|b-b_0|/(b_1-b_0)]^\alpha)$$

where $b_0$ is the point at which $\Delta(b)$ is maximum, $b_1$ is the point at which $\Delta(b)$ % is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number. Deltas are conventionally expressed as percents.

SUMMARY OF THE INVENTION

One aspect of the present invention relates to an optical fiber for the propagation of an optical signal having a wavelength, the optical fiber including a core; and a cladding layer surrounding the core, wherein the optical fiber has a bending loss of less than 0.5 dB at 1560 nm when wrapped 5 turns around a 20 mm mandrel; and an average fiber pull test loss of less than 0.1 dB in the wavelength range of 1530 nm to 1550 nm.

One aspect of the present invention relates to an optical fiber for the propagation of an optical signal having a wavelength, the optical fiber having a centerline, the optical fiber including a core surrounded by a cladding layer, the cladding layer having an outer radius $r_c$ and an average refractive index $n_c$, the core including a central region disposed around the centerline of the fiber, the central region having a radius $r_1$, a maximum delta $\Delta_1$ of between about 0.4% and about 1.5%, a refractive index profile, a maximum germania concentration $[GeO_2]_1$ of between about 8 wt % and about 30 wt %, and a germania concentration profile; and an annular region surrounding the central region, the annular region being surrounded by the cladding layer, the annular region having an outer radius $r_2$, a minimum delta $\Delta_2$ of between about −0.1% and about 0.05%, a refractive index profile, a maximum germania concentration $[GeO_2]_2$ of between about 2 wt % and about 22 wt %, a germania concentration profile, a maximum fluorine concentration $[F]_2$ of between about 0.5 wt % and about 3.5 wt %, and a fluorine concentration profile.

Another aspect of the present invention relates to an optical fiber for the propagation of an optical signal having a wavelength, the optical fiber including a core surrounded by a cladding layer, the cladding layer having an average refractive index $n_c$, the core including a central region having a radius $r_1$, a maximum delta $\Delta_1$ of between about 0.4% and about 1.5%, a refractive index $\alpha$-profile having an α of between about 1 and about 10, a maximum germania concentration $[GeO_2]_1$ of between about 8 wt % and about 30 wt %, and a germania concentration profile; and an annular region, the annular region having a maximum germania concentration $[GeO_2]_2$ of between about 2 wt % and about 22 wt %, and a maximum fluorine concentration $[F]_2$ of between about 0.5 wt % and about 3.5 wt %, the annular region having an inner subregion and an outer subregion, the inner subregion surrounding the central region, the inner subregion having a radius $r_{2a}$, a maximum delta $\Delta_{2a}$ of between about 0% and about 0.2%, a refractive index α-profile having an α of between about 1 and about 10, the outer subregion surrounding the inner subregion and being surrounded by the cladding layer, the annular region having a radius $r_{2b}$, a minimum delta $\Delta_{2b}$ of between about –0.1% and about 0%, and a refractive index profile.

Another aspect of the present invention relates to an optical fiber for the propagation of an optical signal having a wavelength, the optical fiber including a core surrounded by a cladding layer, the cladding layer having an average refractive index $n_c$, the core including a central region having a radius $r_1$, a maximum delta $\Delta_1$ of between about 0.7% and about 1.2%, a refractive index α-profile having an α of between about 1 and about 10, a maximum germania concentration $[GeO_2]_1$ of between about 14 wt % and about 24 wt %, and a germania concentration profile; and an annular region, the annular region having a maximum germania concentration $[GeO_2]_2$ of between about 3.5 wt % and about 12 wt %, and a maximum fluorine concentration $[F]_2$ of between about 0.7 wt % and about 1.2 wt %, the annular region having an inner subregion and an outer subregion, the inner subregion surrounding the central region, the inner subregion having a radius $r_{2a}$, a maximum delta $\Delta_{2a}$ of between about 0% and about 0.2%, a refractive index α-profile having an α of between about 1 and about 10, the outer subregion surrounding the inner subregion and being surrounded by the cladding layer, the annular region having a radius $r_{2b}$, a minimum delta $\Delta_{2b}$ of between about –0.1% and about 0%, and a refractive index profile.

Another aspect of the invention relates to an optical fiber component including an optical fiber for the propagation of an optical signal having a wavelength, the optical fiber having a centerline, the optical fiber including a core; and a cladding layer surrounding the core, wherein the optical fiber has a bending loss of less than 0.5 dB at 1560 nm when wrapped 5 turns around a 20 mm mandrel; and an average fiber pull test loss of less than 0.1 dB in the wavelength range of 1530 nm to 1550 nm.

The optical fibers of the present invention result in a number of advantages over prior art optical fibers. For example, the optical fibers of the present invention have low bend losses, and are suitable for the production of optical fiber couplers with low coupling loss. The optical fibers of the present invention may be spliced to conventional optical fibers with low loss. The optical fibers of the present invention also have low attenuation. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE PREFERRED EMBODIMENTS

Figure 1:
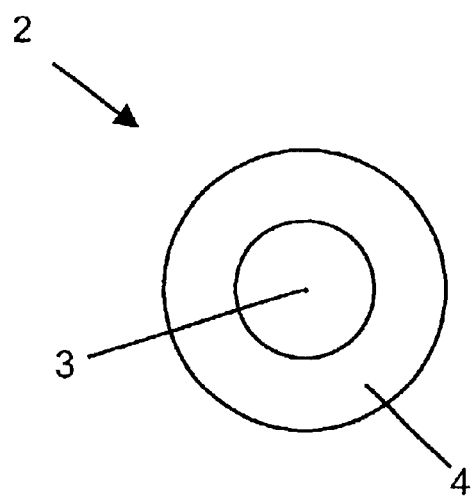
FIG. 1 is a cross sectional schematic view of an optical fiber according to one aspect of the present invention.

The invention disclosed and described herein relates to an optical fiber suitable for the manufacture of optical fiber couplers while having a low bend loss, low splice loss, and low attenuation. FIG. 1 shows a cross-sectional schematic view of an example of an optical fiber of the present invention. The optical fiber 2 includes a core 3, and a cladding 4. As the skilled artisan will appreciate, the core and the cladding may be uniform in composition, or may include various subregions.

Optical fibers according to one embodiment of the present invention have low bending losses. For example, the optical fibers of the present invention may have bending losses of less than about 0.5 dB at a wavelength of 1560 nm when wrapped 5 turns around a 20 mm diameter mandrel. Desirable optical fibers of the present invention have bending losses of less than about 0.1 dB at a wavelength of 1560 nm when wrapped 5 turns around a 20 mm diameter mandrel. Especially desirable optical fibers of the present invention have bending losses of less than about 0.06 dB at a wavelength of 1560 nm when wrapped 5 turns around a 20 mm diameter mandrel.

The optical fibers according to one embodiment of the present invention have low fiber pull test losses. In a fiber pull test, a single sample of the fiber is flame heated and tapered a given length while its wavelength response is monitored. As used herein, the fiber pull test is performed using an inverted bowl burner having a 12 mm diameter burner with a hydrogen gas flow of 150 mL/min. The fiber is preheated in the hottest part of the flame for 6 seconds, then pulled 20 mm with a pull acceleration of 50 $\mu$m/s$^2$ to a pull velocity of 125 $\mu$m/s. The fiber is heated for 1 second in the flame after the pull is complete. In the experiments of Example 2, a FBT draw model GBY-40 from Globe Y Manufacturing Co. was used to pull the fiber. The measurement system was a HP broadband LED source (1200–1600 nm) in conjunction with an ANDO optical spectrum analyzer. Optical fibers of the present invention may have an average fiber pull test loss of less than 0.1 dB in the wavelength range of 1530 nm to 1550 nm. Desirable optical fibers of the present invention have maximum fiber pull test losses of less than 0.1 dB in the wavelength range of 1530 nm to 1550 nm. Especially desirable optical fibers of the present invention have average fiber pull test losses of less than 0.05 dB in the wavelength range of 1530 nm to 1550 nm.

Figure 2:
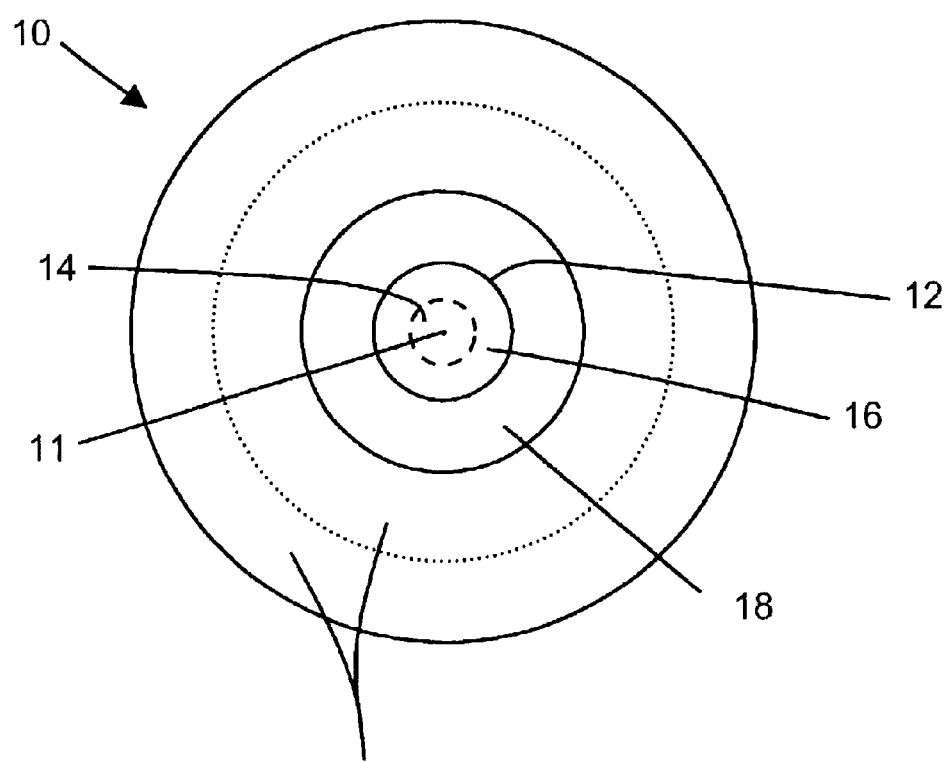
FIG. 2 is a cross-sectional schematic view of an optical fiber according to one embodiment of the present invention.
Figure 3:
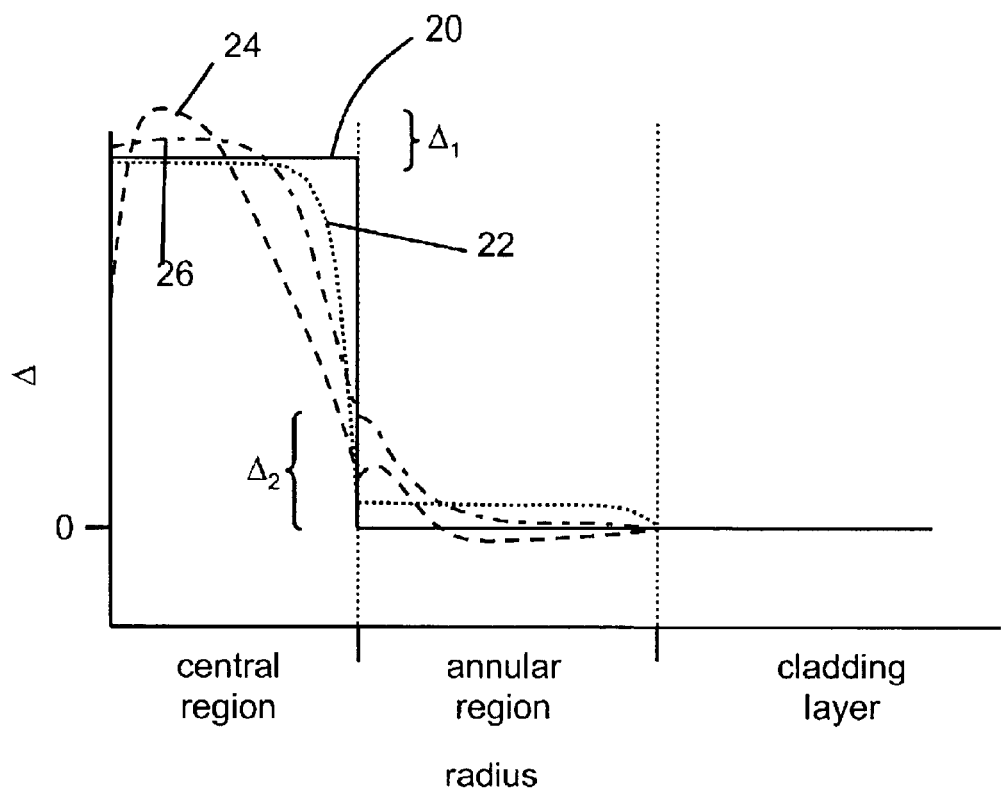
FIG. 3 is a graph showing refractive index profiles of examples of optical fibers according to one aspect of the present invention.

FIG. 2 shows a schematic of an exemplary optical fiber according to one embodiment of the present invention. The optical fiber 10 includes a core 12 having a central region 14 and an annular region 16 surrounding the central region. The optical fiber has a centerline 11, around which the central region of the core is disposed. The skilled artisan will appreciate that the centerline is not a physical feature; rather, it is a reference line at the center of the fiber. The core is surrounded by a cladding layer 18. As is customary, the fiber may be coated with layers of polymer 19. Exemplary refractive index profiles according to one aspect of the invention are shown in FIG. 3 as plots of $\Delta$ vs. radius. The boundary between the core region and the annular region is defined by an abrupt change in the slope of the refractive index profile. For example, in refractive index profile 20, the central region has a step index profile, and in profile 22, the central region has a rounded step profile. In these profiles, the position of the step defines the boundary between the central region and the annular region. Refractive index profiles 24 and 26 each have a shoulder. In the case of a refractive index profile with a shoulder, the position of the interior portion of the shoulder defines the boundary between the central region and the annular region.

In the optical fibers of the present invention, the central region of the core may have any desired refractive index profile shape, including, for example, a step profile, a rounded step profile, a trapezoidal profile, a rounded trapezoidal profile, or an $\alpha$-profile. It will be appreciated by the skilled artisan that the refractive index profile may have an index depression along the centerline, as shown in refractive index profile 24 of FIG. 3. The refractive index profile of the central region of the core has a maximum delta $\Delta_1$ in the range of about 0.4% to about 1.5%. Desirable optical fibers have a maximum delta $\Delta_1$ in the central region of between about 0.7% and about 1.2%.

The annular region of the core may likewise have any desired refractive index profile shape, including a step profile, a rounded profile, a trapezoidal profile, a rounded trapezoidal profile, or an $\alpha$-profile. The annular region of the core has a minimum delta $\Delta_2$ in the range of about −0.1% to about 0.05%. In one embodiment of the invention, the minimum delta $\Delta_2$ of the annular region maybe between about −0.01% and about 0.01%. At the outer edge of the annular region, the delta of the annular region usually becomes substantially equal to zero, as shown in FIG. 3. In order to minimize bend loss, the skilled artisan may adjust the relative fluorine and germania concentrations in the annular region of the core such that the maximum delta $\Delta_2$ of the annular region is less than about 0.2%, or even less than 0.1%.

Figure 4:
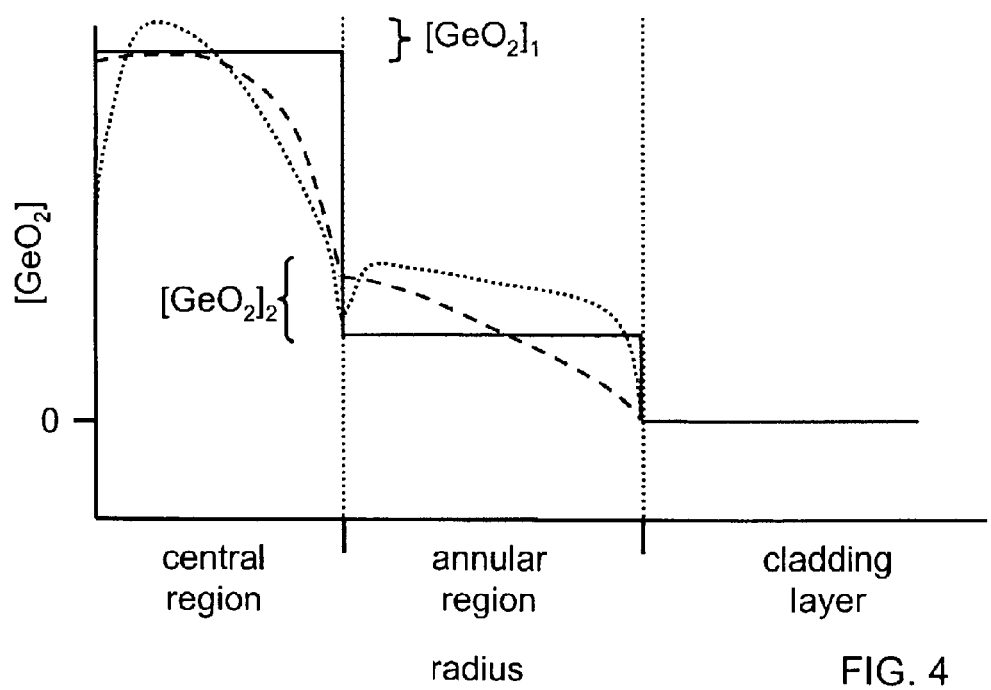
FIG. 4 is a graph showing germania concentration profiles of examples of optical fibers according to one aspect of the present invention.

FIG. 4 shows germania concentration profiles for fibers exemplary of one aspect of the present invention. The germania concentration profile in each region of the core may have any desired shape, including a step profile, a rounded step profile, a trapezoidal profile, a rounded trapezoidal profile, or an $\alpha$-profile. In the central region of the core, the maximum germania concentration $[GeO_2]_1$ is between about 8 wt % and about 30 wt %. Desirable optical fibers have a central region having a maximum germania concentration $[GeO_2]_1$ of between about 14 wt % and about 24 wt %. In the annular region of the core, the maximum germania concentration $[GeO_2]_2$ is between about 2 wt % and about 22 wt %. In desirable optical fibers, the maximum germania concentration of the annular region $[GeO_2]_2$ is greater than about 3.5 wt %, or even about 5 wt %. In desirable optical fibers, the maximum germania concentration of the annular region $[GeO_2]_2$ is less than about 16 wt %, about 12 wt %, or even about 8 wt %. The outer edge of the annular region is defined by where the germania concentration of the annular region becomes about equal to zero, as shown in FIG. 4.

Figure 5:
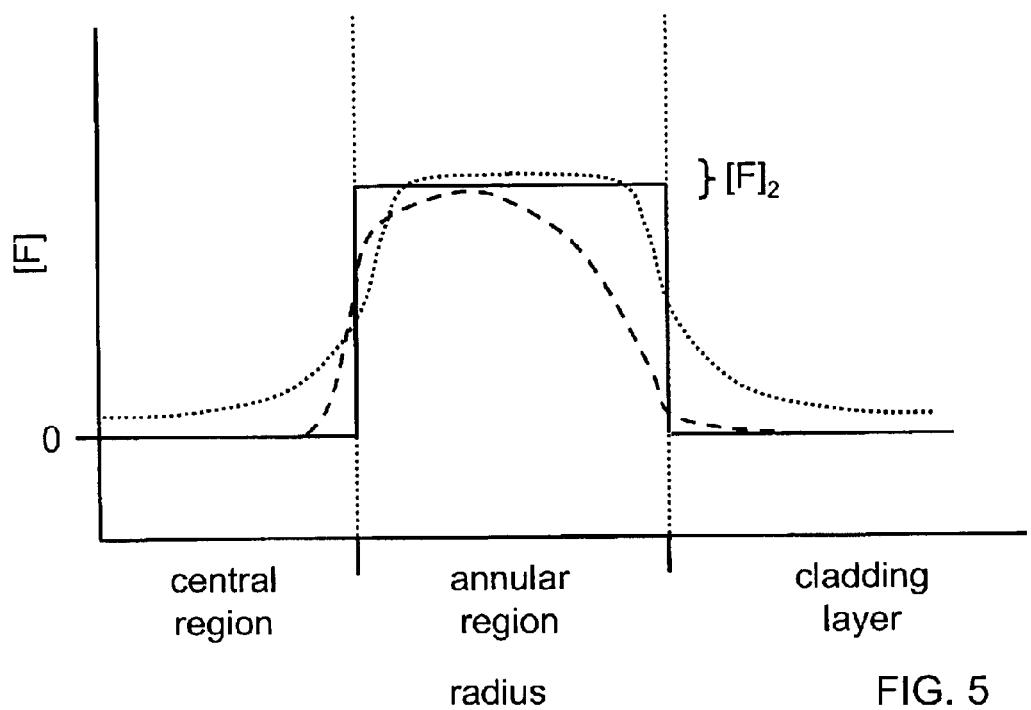
FIG. 5 is a graph showing fluorine concentration profiles of examples of optical fibers according to one aspect of the present invention.

FIG. 5 shows fluorine concentration profiles for fibers exemplary of one aspect of the present invention. The fluorine concentration profile in each region of the core may any desired shape, including a step profile, a rounded step profile, a trapezoidal profile, a rounded trapezoidal profile, or an $\alpha$-profile. In the annular region of the core, the maximum fluorine concentration $[F]_2$ is between about 0.5 wt % and about 3.5 wt %. In desirable optical fibers, the maximum fluorine concentration $[F]_2$ in the annular region of the core is less than about 2 wt % or even about 1.2 wt %. In desirable optical fibers, the maximum fluorine concentration $[F]_2$ in the annular region of the core is greater than about 0.7 wt %. In preferred embodiments of the present invention, the central region of the core has a relatively low concentration of fluorine. For example, the concentration of fluorine along the centerline of the optical fiber may be less than about 0.5 wt %, or even less than about 0.3 wt %.

For some applications, it may be desirable to include other dopants in the annular region of the core of the optical fibers of the present invention. For example, the annular region may contain phosphorus, with a maximum concentration of, for example, between about 0.6% and about 1.2 wt % as $P_2O_5$. The annular region may contain boron, with a maximum concentration of, for example, between about 0.8 wt % and about 1.2 wt % as $B_2O_3$. The annular region may contain aluminum, with a maximum concentration of, for example, between about 1.6 wt % and about 2.4 wt % as $Al_2O_3$. The use of phosphorus, boron and aluminum as dopants for optical fibers is well-known by the skilled artisan, and is not described in detail here. Other dopants, such as chlorine, may also be used. For example, up to about 0.3 wt % of chlorine may be included in the core and/or cladding layers of the inventive optical fibers.

The core is surrounded by a cladding layer, as shown in FIG. 2. The cladding layer has an average refractive index $n_c$. The cladding layer is preferably at least about 20 $\mu$m thick, and is preferably relatively constant in index (e.g. having a variation in delta of less than about ±0.05%). The cladding layer may be surrounded by other cladding layers. For example, it may be desirable to include germania, boron, fluorine and chlorine in an outer cladding layer, in accordance with optical fiber coupler manufacturing techniques familiar to the skilled artisan.

Figure 6:
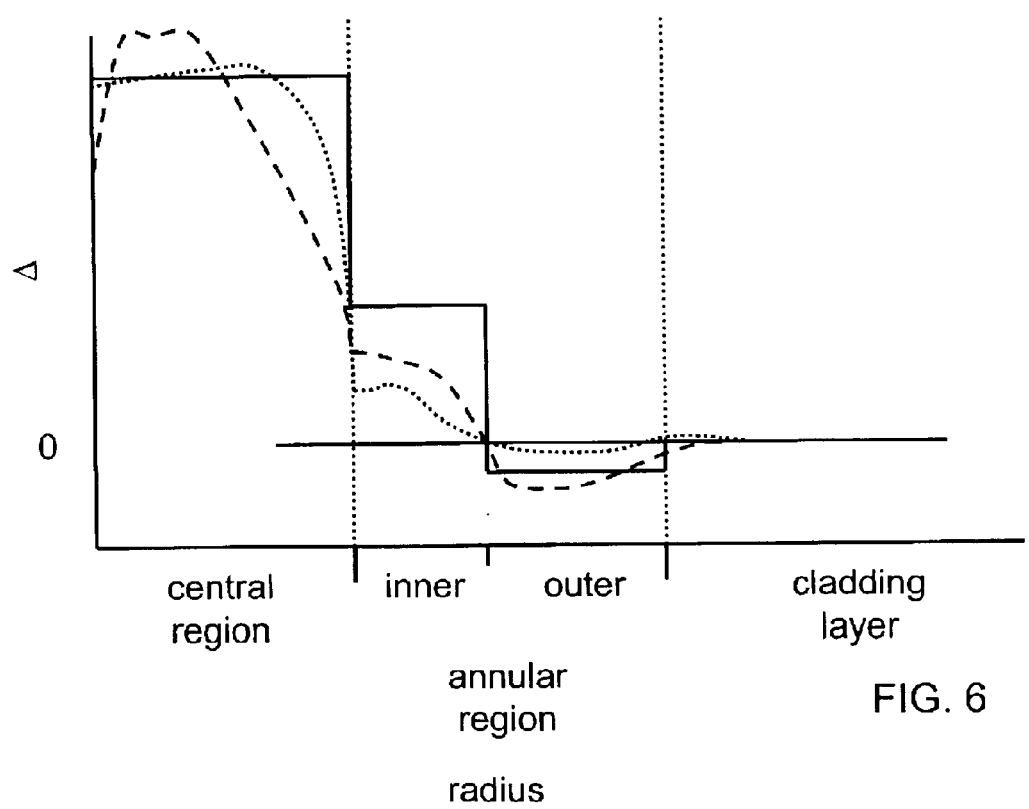
FIG. 6 is a graph showing refractive index profiles of examples of optical fibers according to another aspect of the present invention.

A set of refractive index profiles according to one possible embodiment of the invention is shown in FIG. 6. The refractive index profiles, germania concentrations, and fluorine concentrations are substantially as described above. In each refractive index profile of FIG. 6, the annular region may be subdivided into an inner subregion and an outer subregion. The boundary between the inner subregion and the outer subregion is defined by the point where the refractive index profile crosses the line of zero delta. The inner subregion has a maximum delta $\Delta_{2a}$ of between about 0% and about 0.2%, and a maximum germania concentration $[GeO_2]_{2a}$ of between about 2 wt % and about 20 wt %. The outer subregion has a minimum delta $\Delta_{2b}$ of between about –0.1% and about 0%. Desirable optical fibers may have a $\Delta_{2a}$ of less than about 0.1%, a $[GeO_2]_{2a}$ of less than about 10 wt %, or a $\Delta_{2b}$ of less negative than about –0.05%.

Figure 7:
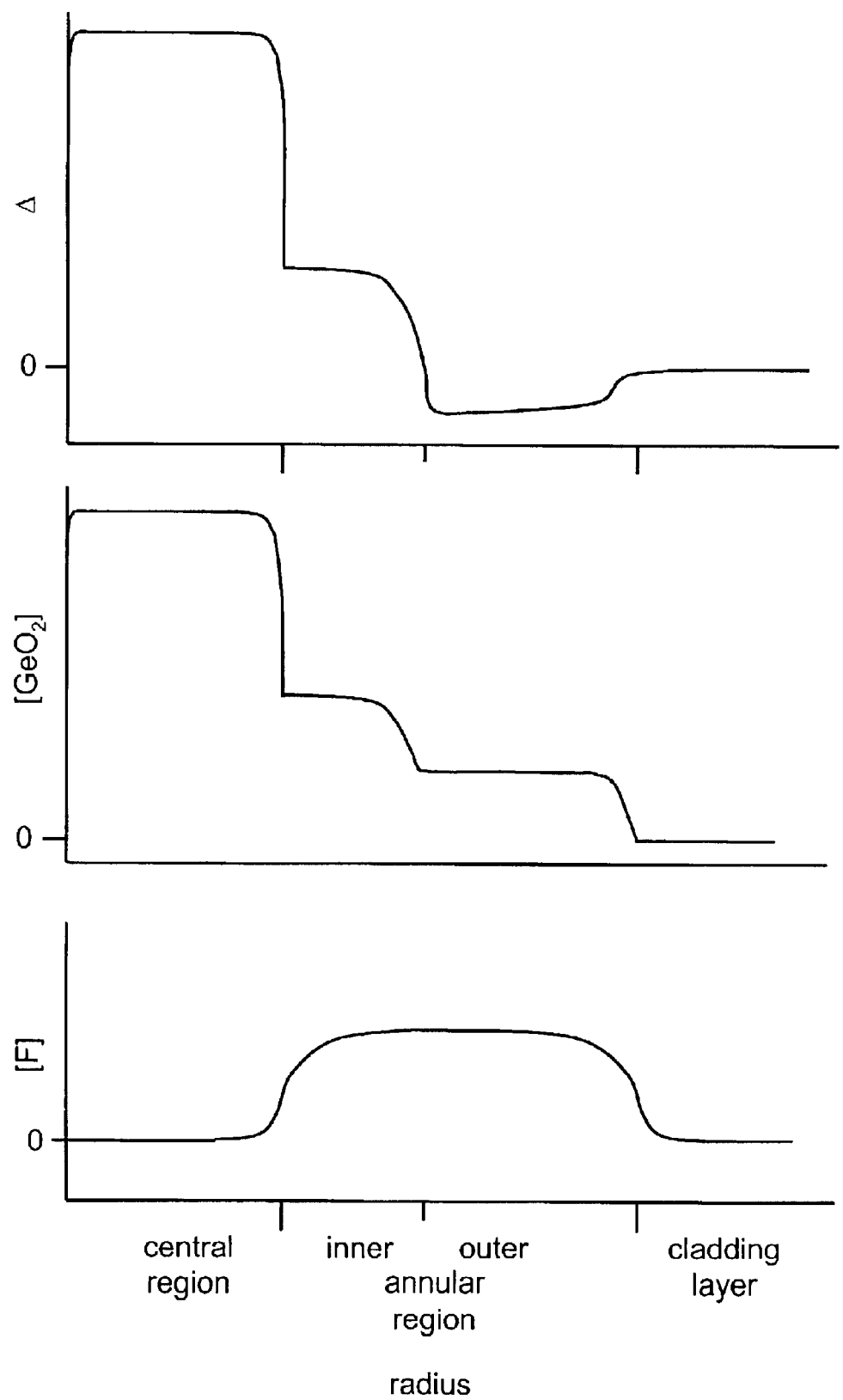
FIG. 7 is a set of graphs showing refractive index, germania concentration and fluorine concentration profiles for an exemplary embodiment of the present invention.

In some cases, it maybe desirable to vary the germania concentration significantly over the annular region. For example, FIG. 7 shows refractive index, germanium concentration, and fluorine concentration profiles for such an optical fiber. In this embodiment of the invention, the inner subregion has a maximum delta $\Delta_{2a}$ of between about 0% and about 0.1%, and a maximum germania concentration $[GeO_2]_{2a}$ of between about 5 wt % and about 10 wt %. The outer subregion has a minimum delta $\Delta_{2b}$ of between about –0.1% and about 0%, and a maximum germania concentration $[GeO_2]_{2b}$ of between about 2 wt % and about 5 wt %. While in the example of FIG. 7, the maximum concentration of fluorine is the same in both subregions of the annular region, the fluorine concentration may be varied in a similar manner.

Figure 8:
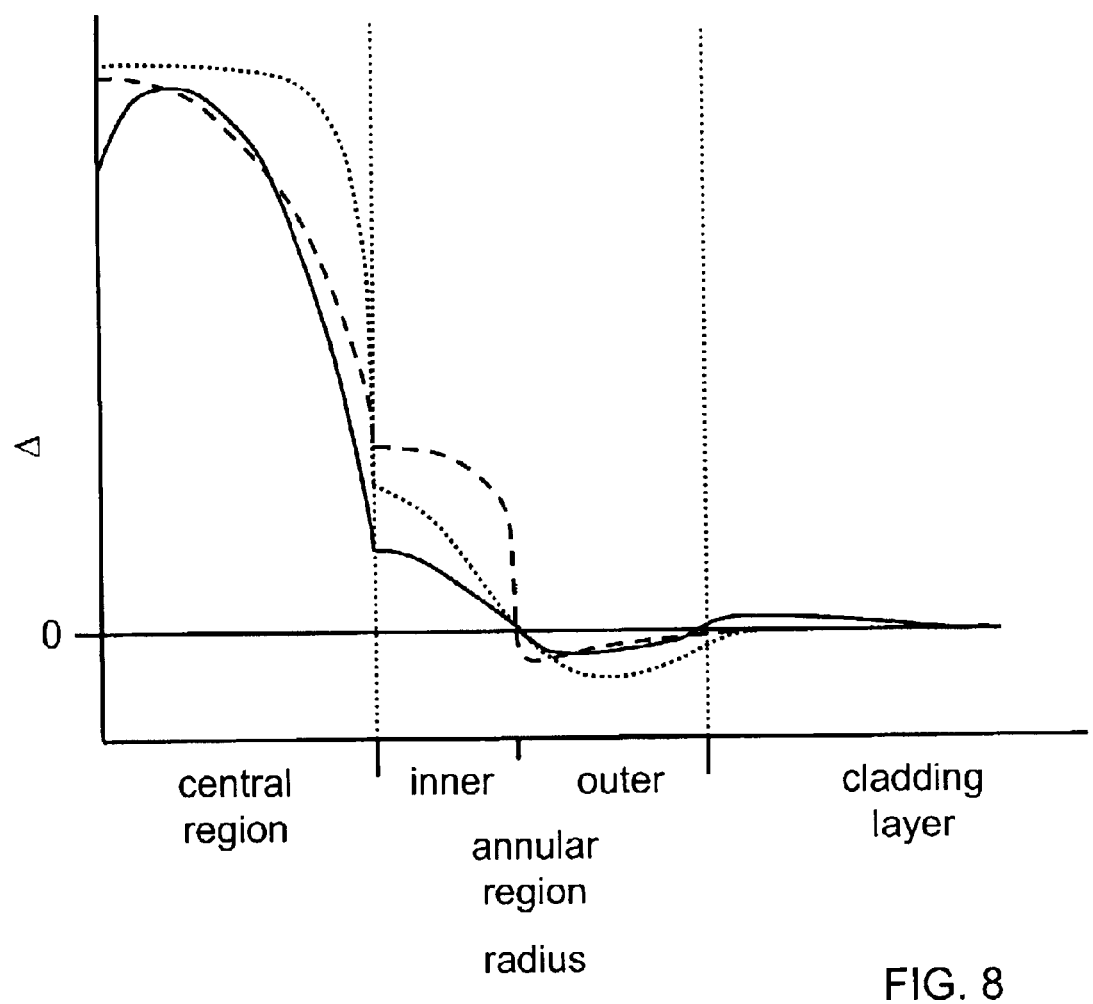
FIG. 8 is a graph showing refractive index profiles of examples of optical fibers according to yet another aspect of the present invention.

A set of refractive index profiles according to another aspect of the invention is shown in FIG. 8. In these optical fibers, the central region of the core has a maximum delta $\Delta_1$ of between about 0.4% and about 1.5%, preferably between about 0.7% and about 1.2%. The central region has a maximum germania concentration $[GeO_2]_1$ of between about 8 wt % and about 30 wt %, preferably between about 14 wt % and about 24 wt %. The central region has an refractive index α-profile with an α between about 1 and about 10, and may include a centerline refractive index depression. Preferably, there is very little fluorine in the central region of the core. For example, the fluorine concentration along the centerline is preferably less than about 0.5 wt % or even less than about 0.3 wt %. The annular region of the core has a maximum germania concentration $[GeO_2]_2$ of between about 2 wt % and about 22 wt %. In desirable optical fibers, the maximum germania concentration of the annular region $[GeO_2]_2$ is greater than about 3.5 wt %, or even about 5 wt %. In desirable optical fibers, the maximum germania concentration of the annular region $[GeO_2]_2$ is less than about 16 wt %, about 12 wt %, or even about 8 wt %. The annular region of the core has a maximum fluorine concentration $[F]_2$ of between about 0.5% wt % and about 3.5 wt %. In desirable optical fibers, the maximum fluorine concentration $[F]_2$ in the annular region of the core is less than about 2 wt % or even about 1.2 wt %. In desirable optical fibers, the maximum fluorine concentration $[F]_2$ in the annular region of the core is greater than about 0.7 wt %. The annular region of the core may be subdivided into inner and outer subregions as described above. The inner subregion has a maximum delta $\Delta_{2a}$ of between about 0% and about 0.2%, and a refractive index α-profile having an α of between about 1 and about 10. Preferably $\Delta_{2a}$ is less than about 0.1%. The outer subregion has a minimum delta $\Delta_{2b}$ of between about –0.1% and about 0%.

In the optical fibers of the present invention, the radii of the central region and the annular region of the core layer are preferably selected to give an optical fiber having single mode operation at wavelengths greater than about 980 nm. The outer radius $r_2$ of the annular region is often chosen to be in the range of two to five times the radius $r_1$ of the central region. For example, the radius $r_1$ of the central region may be between about 2 μm and about 5 μm, and the outer radius $r_2$ of the annular region may be between about 6 μm and about 30 μm. The outer radius of the uncoated optical fiber may have any desired value. For example, the outer radius of the optical fiber may be about 75 μm, about 62.5 μm, or about 40 μm.

In desirable embodiments of the present invention, the optical fibers have low splicing losses to standard single mode fibers. For example, the optical fibers of the present invention may be splicable with a splicing loss of less than 0.13 dB to a step-index single mode fiber having a Ge-doped silica glass core with a diameter of 8.2 mm and a core delta of 0.36%, and a silica glass cladding. An example of such an optical fiber is SMF-28™, available from Corning Incorporated. The skilled artisan may use a standard fiber splicer, such as a Fujikura 30S, or an Ericsson 975. The splicing is preferably performed without pre- or post-splice heat treatment steps.

Preferably, the optical fibers disclosed herein are made by a vapor deposition process. Even more preferably, the optical fibers disclosed herein are made by outside vapor deposition (OVD) processes familiar to the skilled artisan. Thus, for example, known OVD laydown, consolidation and draw techniques may be advantageously used to produce the optical fibers of the present invention. Other processes, such as modified chemical vapor deposition (MCVD) or vapor axial deposition (VAD) may be used. Thus, the refractive index and compositional profiles of the optical fibers disclosed herein may be accomplished using manufacturing techniques known to those skilled in the art including, but in no way limited to, OVD, VAD and MCVD processes.

The optical fibers of the present invention may also be designed by the skilled artisan to have other desirable properties. For example, inventive optical fibers may be designed to have attenuations of less than about 2 dB/km at 980 nm, and less than about 1 dB/km at 1560 nm. The optical fibers described herein may be designed to have a range of cutoff wavelengths. For example, cutoff wavelengths of the inventive fibers may be about 940±40 nm. The skilled artisan will adjust the refractive index and concentration profiles in order to yield an optical fiber with other desired properties.

The optical fibers of the present invention may find use in the manufacture of various optical fiber components. For example, optical fiber couplers may be made from the optical fibers of the present invention using a fused biconical taper process familiar to the skilled artisan. As such, another aspect of the present invention relates to an optical component constructed using the optical fibers described hereinabove. For example, according to one embodiment of the present invention, an optical fiber component includes an optical fiber for the propagation of an optical signal having a wavelength, the optical fiber having a centerline, the optical fiber including a core; and a cladding layer surrounding the core, wherein the optical fiber has a bending loss of less than 0.5 dB at 1560 nm when wrapped 5 turns around a 20 mm mandrel; and an average fiber pull test loss of less than 0.1 dB in the wavelength range of 1530 nm to 1550 nm.

The invention will now be illustrated by the following non-limiting examples.

EXAMPLE 1

Figure 9:
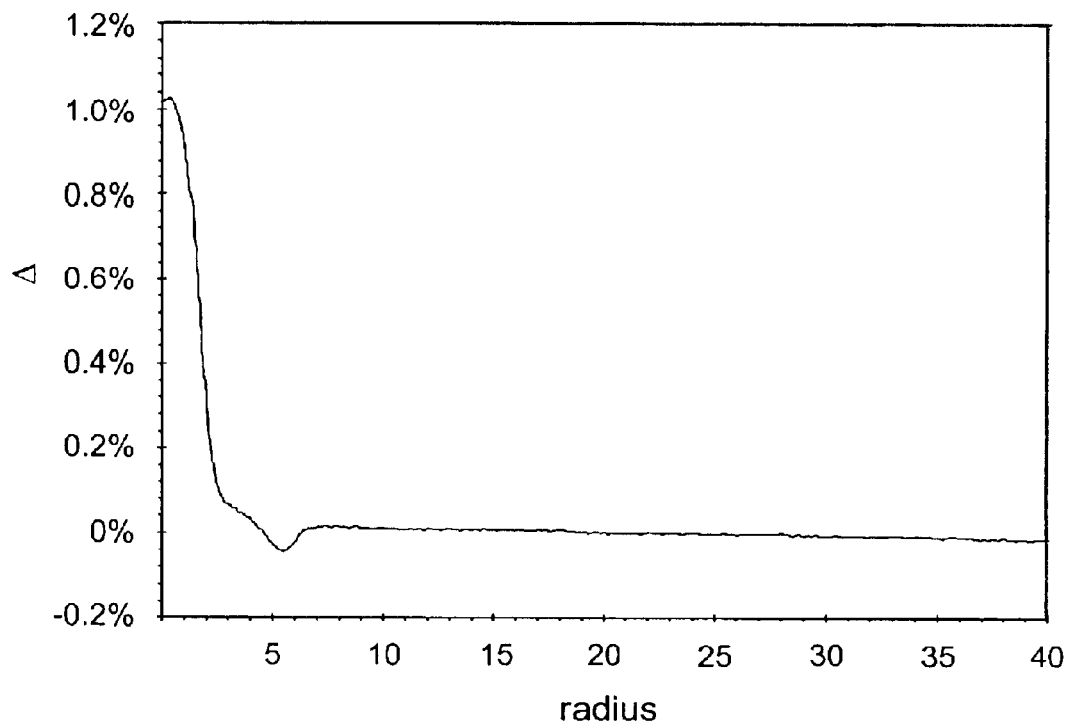
FIG. 9 is a graph showing the refractive index profile of the optical fiber of Example 1.
Figure 10:
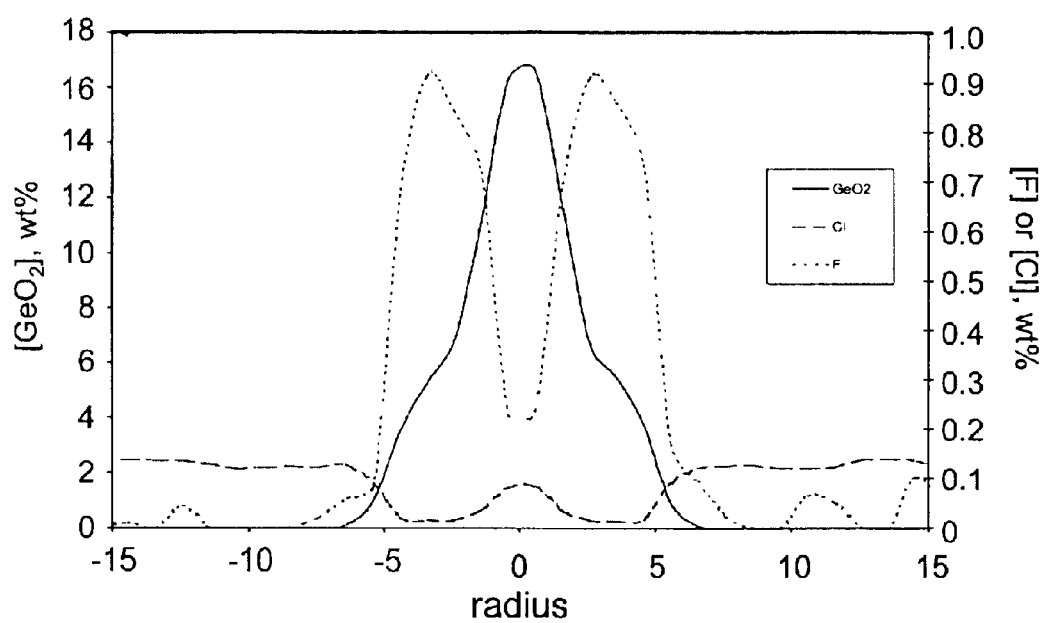
FIG. 10 is a graph showing the germania, fluorine and chlorine concentration profiles of the optical fiber of Example 1.

An optical fiber of the present invention was fabricated using standard OVD processing. A plot of delta vs. radius is provided in FIG. 9. A graph showing the germania, fluorine and chlorine concentration profiles of the optical fiber is provided in FIG. 10. This optical fiber has the following parameters:

$\Delta_1 = 1.02\%$ $[GeO_2]_1 = 16.6\%$ centerline $[F] = 0.2\%$ $r_1 = 2.5$ μm $\Delta_{2a} = 0.08\%$ $[GeO_2]_{2a} = 6\%$ $r_{2a} = 5$ μm $\Delta_{2b} = -0.04\%$ $[F]_2 = 0.9\%$ $r_{2b} = 7$ μm uncoated fiber radius = 125 μm This optical fiber also includes about 0.1 wt % chlorine in the central region of the core and in the cladding. The skilled artisan will note that the refractive index of the cladding in this fiber decreases slightly with increasing radius.

This optical fiber has the following properties:

Mode field diameter at a wavelength of 1000 nm: 4.1 mm

Mode field diameter at a wavelength of 1550 nm: 6.5 mm

Cutoff wavelength: 955±5 nm

Attenuation at a wavelength of 980 nm: 1.89 dB/km

Attenuation at a wavelength of 1550 nm: 0.35 dB/km

Increase in attenuation when wrapped 5 turns around a 10 mm diameter mandrel: 3.8 dB Increase in attenuation when wrapped 5 turns around a 20 mm diameter mandrel: <0.05 dB

EXAMPLE 2

Figure 11:
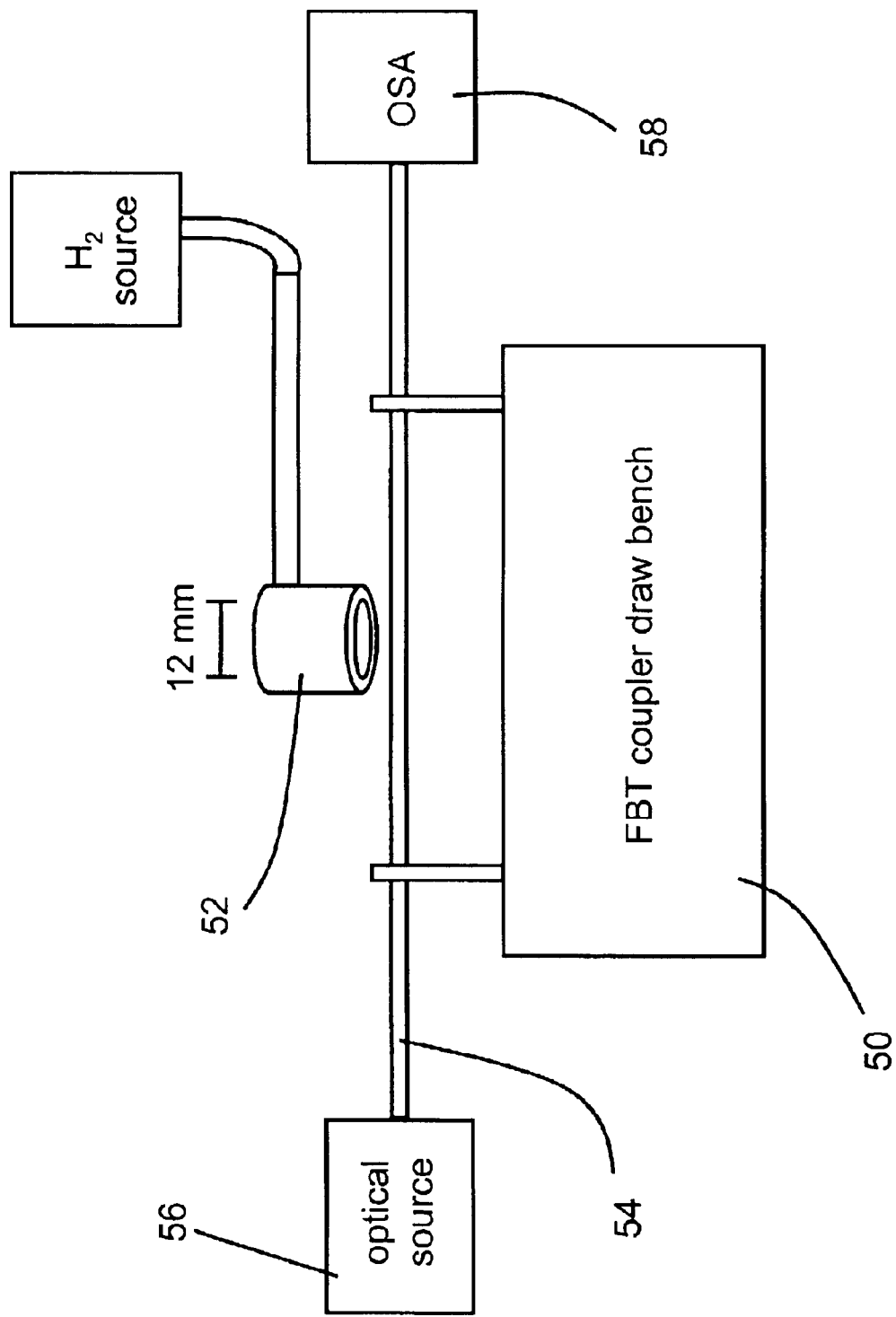
FIG. 11 is a schematic view of an apparatus used to measure fiber pull test losses.
Figure 12:
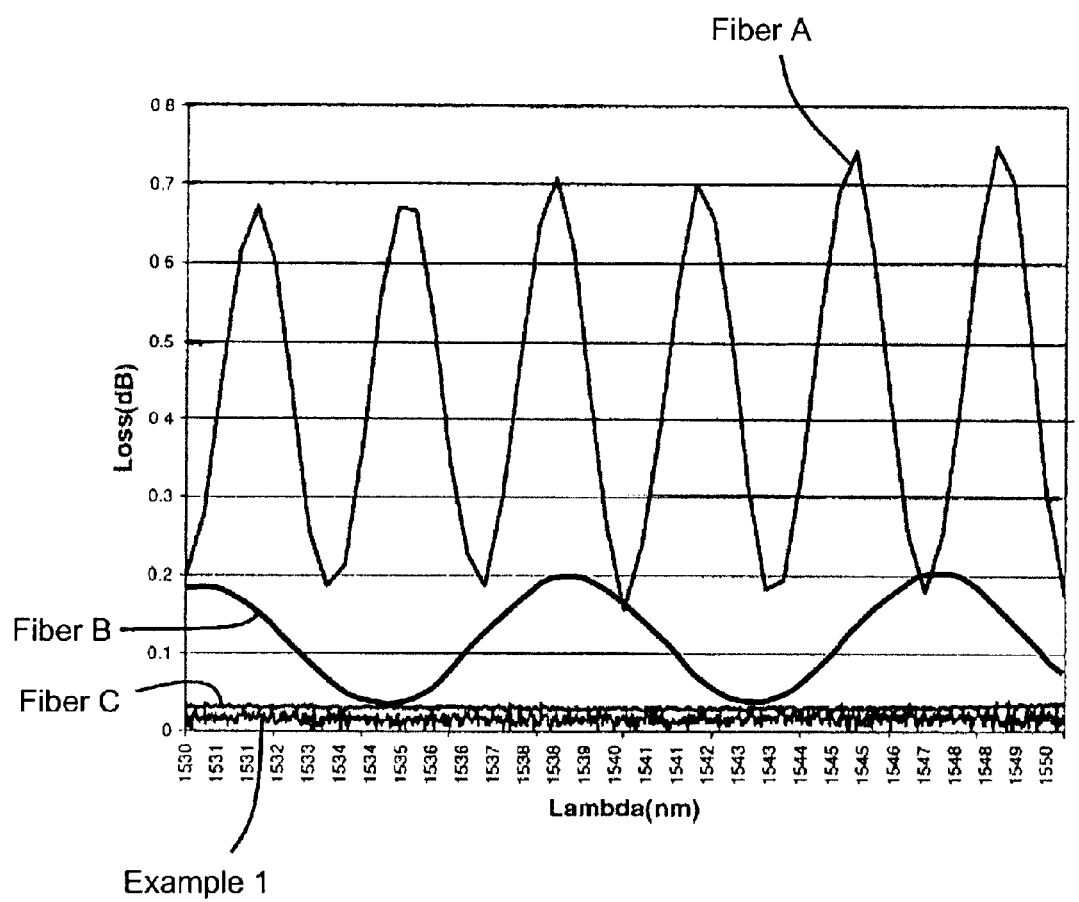
FIG. 12 is a graph showing wavelength dependent fiber pull test losses for various optical fibers.

Fiber pull tests were performed on the fiber of Example 1 as well as on commercially available optical fibers commonly used in the fabrication of couplers. The fiber pull tests were performed using the apparatus depicted schematically in FIG. 11. A commercially available fused biconical taper coupler manufacturing bench 50 (GBY-40 from Globe Manufacturing Co.) was equipped with a 12 mm diameter inverted bowl burner 52. Optical fiber 54 was arranged in the pulling mechanism of FBT bench 50, and one end of the optical fiber was coupled to an HP broadband LED source 56 operating from 1200 nm to 1600 nm. The other end of the optical fiber was coupled to an ANDO optical spectrum analyzer 58. A flame was generated by the burner by burning 150 mL/min hydrogen using the oxygen available in the atmosphere. The optical fiber was placed in the hottest part of the flame, preheated for 6 seconds, then pulled a total distance of 20 mm using an acceleration of 50 μm/s² to a maximum velocity of 125 μm/s. After the pull, the fiber was heated in the flame for 1 second. Loss for the pulled fiber vs. wavelength for various optical fibers is shown in FIG. 12. The average fiber pull test loss is the average over the wavelength range of 1520 nm to 1550 nm, and the maximum fiber pull test loss is the highest loss observed over the wavelength range of 1520 nm to 1550 nm.

Bending loss and fiber pull test results for the fiber of Example 1 as well as for commercially available fibers A, B, and C are summarized in Table 1. As the skilled artisan will appreciate, only the fiber of Example 1 exhibits both low bending loss and low fiber pull test loss.

TABLE 1

|  | Fiber A | Fiber B | Fiber C | Example 1 |
|---|---|---|---|---|
| Bending loss, 5 turns around 20 mm mandrel (dB) | 0.10 | 0.06 | 0.85 | <0.05 |
| Average fiber pull test loss (dB) | 0.12 | 0.44 | 0.03 | 0.02 |
| Maximum fiber pull test loss (dB) | 0.20 | 0.75 | 0.03 | 0.03 |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber for the propagation of an optical signal having a wavelength, the optical fiber having a centerline, the optical fiber comprising:

a core; and a cladding layer surrounding the core, wherein the optical fiber has a bending loss of less than 0.5 dB at 1560 nm when wrapped 5 turns around a 20 mm mandrel; and an average fiber pull test loss of less than 0.1 dB in the wavelength range of 1530 nm to 1550 nm.

2. The optical fiber of claim 1 wherein the optical fiber has a bending loss of less than 0.1 dB at 1560 nm when wrapped 5 turns around a 20 mm mandrel.

3. The optical fiber of claim 1 wherein the optical fiber has a maximum fiber pull test loss of less than 0.1 dB in the wavelength range of 1530 nm to 1550 nm.

4. The optical fiber of claim 1 wherein the optical fiber has an average fiber pull test loss of less than 0.05 dB in the wavelength range of 1530 nm to 1550 nm.

5. The optical fiber of claim 1, the optical fiber having an attenuation of less than 2 dB/km at 980 nm, and less than 1 dB/km at 1560 nm.

6. The optical fiber of claim 1, wherein the cladding layer has an outer radius $r_c$ and an average refractive index $n_c$, and wherein the core includes:

a central region disposed around the centerline of the fiber, the central region having a radius $r_1$, a maximum delta $\Delta_1$ of between about 0.4% and about 1.5%, a refractive index profile, a maximum germania concentration $[GeO_2]_1$ of between about 8 wt % and about 30 wt %, and a germania concentration profile; and an annular region surrounding the central region, the annular region being surrounded by the cladding layer, the annular region having an outer radius $r_2$, a minimum delta $\Delta_2$ of between about −0.1% and about 0.05%, a refractive index profile, a maximum germania concentration $[GeO_2]_2$ of between about 2 wt % and about 22 wt %, a germania concentration profile, a maximum fluorine concentration $[F]_2$ of between about 0.5 wt % and about 3.5 wt %, and a fluorine concentration profile.

7. The optical fiber of claim 6 wherein the maximum delta $\Delta_1$ of the central region is between about 0.7% and about 1.2%, and the maximum germania concentration [GeO$_2$]$_1$ of the central region is between about 14 wt % and about 24 wt %.

8. The optical fiber of claim 6 wherein the maximum germania concentration [GeO$_2$]$_2$ of the annular region is between about 3.5 wt % and about 12 wt %.

9. The optical fiber of claim 6 wherein the annular region has a maximum fluorine concentration of between about 0.7 wt % and about 1.2 wt %.

10. The optical fiber of claim 6 wherein the minimum delta $\Delta_2$ of the annular region is between about −0.01% and about 0.01%.

11. The optical fiber of claim 6 wherein the concentration of fluorine along the centerline of the optical fiber is less than about 0.5 wt %.

12. The optical fiber of claim 6 wherein the annular region has a phosphorus concentration profile and a maximum phosphorus concentration of between about 0.6 wt % and about 1.2 wt % as P$_2$O$_5$.

13. The optical fiber of claim 6 wherein the annular region has a boron concentration profile and a maximum boron concentration of between about 0.8 wt % and about 1.2 wt % as B$_2$O$_3$.

14. The optical fiber of claim 6 wherein the annular region has an aluminum concentration profile and a maximum aluminum concentration of between about 1.6 wt % and about 2.4 wt % as Al$_2$O$_3$.

15. The optical fiber of claim 6 wherein the radius r$_1$ of the central region is between about 2 μm and about 5 μm, and wherein the outer radius of the annular region is between about 6 μm and about 30 μm.

16. The optical fiber of claim 6, wherein the annular region includes an inner subregion and an outer subregion,
the inner subregion surrounding the central region, the inner subregion having an outer radius r$_{2a}$, a maximum delta $\Delta_{2a}$ of between about 0% and about 0.2%, a maximum germania concentration [GeO$_2$]$_{2a}$ of between about 2 wt % and about 20 wt %,
the outer subregion surrounding the inner subregion and being surrounded by the cladding layer, the outer subregion having an outer radius r$_{2b}$, a minimum delta $\Delta_{2b}$ of between about −0.1% and about 0%.

17. The optical fiber of claim 16 wherein the inner subregion has a maximum germania concentration between [GeO$_2$]$_{2a}$ of between about 5 wt % and about 10 wt %, and wherein the outer subregion has a maximum germania concentration [GeO$_2$]$_{2b}$ of between about 2 wt % and about 5 wt %.

18. The optical fiber of claim 1, wherein the cladding has an average refractive index n$_c$, and wherein the core includes:
a central region having a radius r$_1$, a maximum delta $\Delta_1$ of between about 0.4% and about 1.5%, a refractive index α-profile having an α of between about 1 and about 10, a maximum germania concentration [GeO$_2$]$_1$ of between about 8 wt % and about 30 wt %, and a germania concentration profile; and
an annular region, the annular region having a maximum germania concentration [GeO$_2$]$_2$ of between about 2 wt % and about 22 wt %, and a maximum fluorine concentration [F]$_2$ of between about 0.5 wt % and about 3.5 wt %, the annular region having an inner subregion and an outer subregion,
the inner subregion surrounding the central region, the inner subregion having a radius r$_{2a}$, a maximum delta $\Delta_{2a}$ of between about 0% and about 0.2%, a refractive index α-profile having an α of between about 1 and about 10,
the outer subregion surrounding the inner subregion and being surrounded by the cladding layer, the annular region having a radius r$_{2b}$, a minimum delta $\Delta_{2b}$ of between about −0.1% and about 0%, and a refractive index profile.

19. The optical fiber of claim 18 wherein the maximum delta $\Delta_1$ of the central region is between about 0.7% and about 1.2%, and the maximum germania concentration [GeO$_2$]$_1$ of the central region is between about 14 wt % and about 24 wt %.

20. The optical fiber of claim 18 wherein the maximum germania concentration [GeO$_2$]$_2$ of the annular region is between about 3.5 wt % and about 12 wt %.

21. The optical fiber of claim 18 wherein the annular region has a maximum fluorine concentration of between about 0.7 wt % and about 1.2 wt %.

22. The optical fiber of claim 18 wherein the cladding layer has a substantially uniform refractive index, and wherein the outer radius of the cladding layer is at least about 20 μm.

23. The optical fiber of claim 18 wherein the concentration of fluorine along the centerline of the optical fiber is less than about 0.5 wt %.

24. The optical fiber of claim 18 wherein the radius r$_1$ of the central region is between about 2 μm and about 5 μm, and wherein the outer radius of the annular region is between about 6 μm and about 30 μm.

25. The optical fiber of claim 1, wherein the cladding has an average refractive index n$_c$, and wherein the core includes:
a central region having a radius r$_1$, a maximum delta $\Delta_1$ of between about 0.7% and about 1.2%, a refractive index α-profile having an α of between about 1 and about 10, a maximum germania concentration [GeO$_2$]$_1$ of between about 14 wt % and about 24 wt %, and a germania concentration profile; and
an annular region, the annular region having a maximum germania concentration [GeO$_2$]$_2$ of between about 3.5 wt % and about 12 wt %, and a maximum fluorine concentration [F]$_2$ of between about 0.7 wt % and about 1.2 wt %, the annular region having an inner subregion and an outer subregion,
the inner subregion surrounding the central region, the inner subregion having a radius r$_{2a}$, a maximum delta $\Delta_{2a}$ of between about 0% and about 0.2%, a refractive index α-profile having an α of between about 1 and about 10,
the outer subregion surrounding the inner subregion and being surrounded by the cladding layer, the annular region having a radius r$_{2b}$, a minimum delta $\Delta_{2b}$ of between about −0.1% and about 0%, and a refractive index profile.

26. The optical fiber of claim 1, wherein the optical fiber is splicable with a splicing loss of less than 0.13 dB to a step-index single mode fiber having a Ge-doped silica glass core with a diameter of 8.2 mm and a core delta of 0.36%, and a silica glass cladding.

27. An optical fiber for the propagation of an optical signal having a wavelength, the optical fiber having a centerline, the optical fiber comprising:
a core surrounded by a cladding layer, the cladding layer having an outer radius r$_c$ and an average refractive index n$_c$, the core including
a central region disposed around the centerline of the fiber, the central region having a radius r$_1$, a maximum delta $\Delta_1$ of between about 0.4% and about 1.5%, a refractive index profile, a maximum germania concentration $[GeO_2]_1$ of between about 8 wt % and about 30 wt %, and a germania concentration profile; and an annular region surrounding the central region, the annular region being surrounded by the cladding layer, the annular region having an outer radius $r_2$, a minimum delta $\Delta_2$ of between about −0.1% and about 0.05%, a refractive index profile, a maximum germania concentration $[GeO_2]_2$ of between about 2 wt % and about 22 wt %, a germania concentration profile, a maximum fluorine concentration $[F]_2$ of between about 0.5 wt % and about 3.5 wt %, and a fluorine concentration profile.

28. The optical fiber of claim 27 wherein the maximum delta $\Delta_1$ of the central region is between about 0.7% and about 1.2%, and the maximum germania concentration $[GeO_2]_1$ of the central region is between about 14 wt % and about 24 wt %.

29. The optical fiber of claim 27 wherein the maximum germania concentration $[GeO_2]_2$ of the annular region is between about 3.5 wt % and about 12 wt %.

30. The optical fiber of claim 27 wherein the annular region has a maximum fluorine concentration of between about 0.7 wt % and about 1.2 wt %.

31. The optical fiber of claim 27, wherein the annular region includes an inner subregion and an outer subregion, the inner subregion surrounding the central region, the inner subregion having an outer radius $r_{2a}$, a maximum delta $\Delta_{2o}$ of between about 0% and about 0.2%, a maximum germania concentration $[GeO_2]_{2a}$ of between about 2 wt % and about 20 wt %, the outer subregion surrounding the inner subregion and being surrounded by the cladding layer, the outer subregion having an outer radius $r_{2b}$, a minimum delta $\Delta_{2b}$ of between about −0.1% and about 0%.

32. An optical fiber component comprising an optical fiber for the propagation of an optical signal having a wavelength, the optical fiber having a centerline, the optical fiber including:

a core; and a cladding layer surrounding the core, wherein the optical fiber has a bending loss of less than 0.5 dB at 1560 nm when wrapped 5 turns around a 20 mm mandrel; and an average fiber pull test loss of less than 0.1 dB in the wavelength range of 1530 nm to 1550 nm.

* * * * *